| United States Patent [19] | [11] Patent Number: 4,595,557 |
| Bowsky | [45] Date of Patent: Jun. 17, 1986 |

[54] METHOD OF INCREASING HERMETICITY OF METAL COMPONENTS OF GLASS/METAL AND CERAMIC/METAL SEALS

[75] Inventor: Benjamin Bowsky, Maineville, Ohio

[73] Assignee: Emerson Electric Co., St. Louis, Mo.

[21] Appl. No.: 722,014

[22] Filed: Apr. 11, 1985

[51] Int. Cl.⁴ .............................................. B22F 3/00
[52] U.S. Cl. ...................................... 419/49; 65/59.1;
  65/59.25; 174/50.61; 174/152 GM; 429/181;
  429/184; 429/185
[58] Field of Search ............ 174/152 GM, 50.61, 174;
  339/192 RL; 429/181, 184, 185; 75/226, 208 R;
  419/8, 49, 28; 428/552, 553, 555, 554, 630, 670,
  684; 65/59.1, 59.25

[56] References Cited

U.S. PATENT DOCUMENTS 4,144,629 3/1979 Phillips et al. .......................... 419/28

*Primary Examiner*—Stephen J. Lechert, Jr.
*Attorney, Agent, or Firm*—Polster, Polster and Lucchesi

[57] ABSTRACT

A method of forming a hermetic seal with high hermeticity includes the steps of subjecting metal components or stock to hot isostatic pressing, forming a pin or body from the stock, and bonding the pin to a surface defining an opening in a hermetic body. A terminal with high hermeticity is provided by a metal component subjected to hot isostatic pressing and a seal bonded to the pin and body. The seal can be a glass to metal seal or ceramic to metal.

6 Claims, No Drawings

METHOD OF INCREASING HERMETICITY OF METAL COMPONENTS OF GLASS/METAL AND CERAMIC/METAL SEALS

BACKGROUND OF THE INVENTION

Hermeticity requirements of glass to metal and ceramic to metal seals are becoming ever more stringent. Microscopic defects in metal parts used for such seals can severely limit their hermeticity. Heretofore, it has been thought necessary, in those applications in which high hermeticity had to be assured, to use exceptionally pure, clean metal, which requires expensive methods to obtain, such as the vacuum melting of alloys, or vacuum impregnation or pressure impregnation of the metal components. Even with pure metal obtained by such costly methods, it has been found that some terminal components, pins for example, were exhibiting hermetic leak-through.

I have found that such leak-through may be the result of microshrinkage, pipes, seams or laps produced in the reduction process.

One of the objects of this invention is to provide a method of forming a hermetic seal with high hermeticity which substantially eliminates the need for special, costly treatment of metal components, by such methods as vacuum impregnation, pressure impregnation and vacuum melting of alloys.

Another object is to provide such a method and a hermetic seal exhibiting high hermeticity which is simple, economical and highly effective.

Other objects will become apparent to those skilled in the art in the light of the following description.

SUMMARY OF THE INVENTION

In accordance with this invention, generally stated, a method of forming a hermetic seal with high hermeticity is provided which includes subjecting metal stock to hot isostatic pressing, forming a pin or body from the stock, and bonding the components to a surface defining an opening in a hermetic vessel. A terminal with high hermeticity comprises a metal pin and body subjected to hot isostatic pressing and a seal bonding them together. The seal can be glass to metal or ceramic to metal.

DESCRIPTION OF THE PREFERRED EMBODIMENT

The invention will be described as applied to hermetic terminals in which an alloy steel pin is bonded to surfaces defining an opening in a hermetic vessel, which can be in the form of a disc welded into a casing of a hermetic motor, for example. Pin stock, for example 446 steel, drawn to size, is subjected to hot isostatic pressing. The stock is heated to approximately 90% of its melting point temperature, and subjected to high pressure of an inert gas such as argon, in the range of 10,000 to 30,000 pounds per square inch. A short description of hot isostatic pressing is to be found in "Precision Metal" for December, 1984, pages 15 and 18. The treated pin stock is then cut into suitable lengths for use as pins, and the pins are bonded to surfaces defining openings in hermetic vessels or in discs also hot isostatic pressed to be welded into hermetic vessels. The seals can be glass to metal or ceramic to metal, or even epoxy to metal, in some applications, as for example as shown and described in my U.S. Pat. No. 4,362,792. Typical glass to metal or ceramic to metal seal hermetic terminals in which the seals of this invention are used, are shown and described in my U.S. Pat. No. 4,296,275.

I have discovered that the failure of metal components in some circumstances has been a result of imperfections, such as piping produced in the reducing of billet, rolling sheet and drawing of the wire, and that the hot isostatic pressing of the stock eliminates those sources of leakage.

The process of this invention is applicable to metal parts of different composition from the 1018 steel, for example, 304L, Kovar, and to parts different from terminal pin stock. It is, however, particularly applicable to parts that are rolled or drawn in the course of their production and must exhibit complete integrity in the direction of their rolling or drawing. The stock can be cut to size before being subjected to the hot isostatic pressing.

Numerous variations in the method of this invention and in the seals thereof within the scope of the appended claims will occur to those skilled in the art. Merely by way of example, the temperature and pressure employed in the HIP process may be varied, depending upon the metal being treated. The glass-to-metal seals or ceramic to metal seals can be composite seals, of different materials and bonded directly or through an intermediate bonding coating or the like. These are merely illustrative.

I claim:

1. The method of forming a hermetic seal with high hermeticity by subjecting components and/or raw stock and/or ingot to hot isostatic pressing, forming a body and/or pin from said stock, assembling said seal from said components and bonding said hermetic seal into an opening in a body.

2. A terminal with high hermeticity comprising one or more metal components subjected to hot isostatic pressing and a seal bonded to said components.

3. The terminal of claim 2 wherein the seal is a glass-to-metal seal.

4. The terminal of claim 2 wherein the seal is a ceramic to metal seal.

5. The method of forming a hermetic terminal of the type having a body and at least one pin passing through and sealed to said body, to form a seal with high hermeticity comprising subjecting metal pin stock to hot isostatic pressing, forming a pin from said pin stock, and thereafter bonding said pin to a surface defining an opening in said body.

6. The method of claim 5 including the further step of hermetically securing said body in an opening in a hermetic vessel.

* * * * *